United States Patent [19]

Iizuka et al.

[11] Patent Number: 4,690,505

[45] Date of Patent: Sep. 1, 1987

[54] LENS MOUNTING

[75] Inventors: Toshimi Iizuka, Kanagawa; Shigeru Kamata, Tokyo, both of Japan

[73] Assignee: Canon Kabushiki Kaisha

[21] Appl. No.: 740,203

[22] Filed: May 31, 1985

[30] Foreign Application Priority Data

Jun. 14, 1984 [JP] Japan ................. 59-088803

[51] Int. Cl.$^4$ ............................................. G02B 7/02
[52] U.S. Cl. ...................................... 350/252; 350/247
[58] Field of Search ............... 350/252, 251, 242, 245, 350/248, 255, 247

[56] References Cited

U.S. PATENT DOCUMENTS 2,461,190  2/1949  Wolff, Jr. ............................ 350/252
4,088,396  5/1978  Edelstein ............................ 350/252
4,099,852  7/1978  Kobierecki et al. ................. 350/252

Primary Examiner—John K. Corbin
Assistant Examiner—Loha Ben
Attorney, Agent, or Firm—Toren, McGeady & Associates

[57] ABSTRACT

The adjustment of inclination or tilt of a lens cell containing a focusing lens or a lens for zooming with respect to an optical axis is carried out by a cam provided between the cell and a movable sleeve in which the cell is fitted.

7 Claims, 10 Drawing Figures

PRIOR ART FIG. 1A
PRIOR ART FIG. 1B
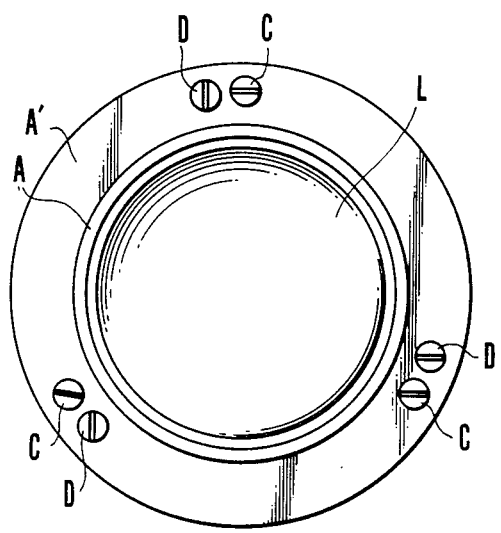
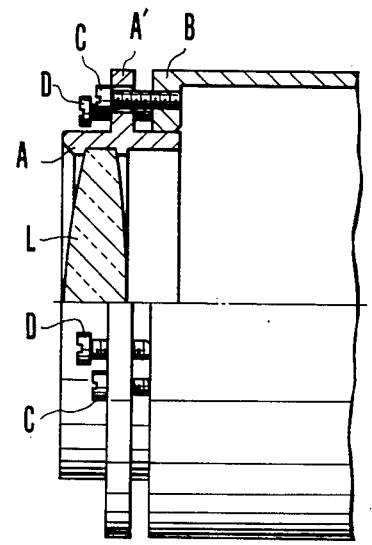
FIG. 2
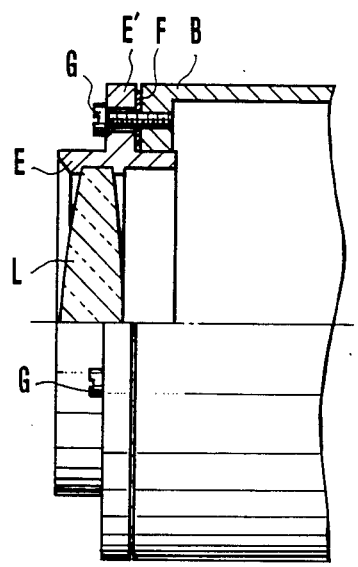

LENS MOUNTING

BACKGROUND OF THE INVENTION

1. Field of the Invention:

This invention relates to lens mountings with an optical element holding device making it possible to adjust the orientation and axial alignment of an optical element.

2. Description of the Prior Art:

An example of a prior known adjusting device is shown in FIGS. 1A and 1B. This device has generally been used for the objective lens of a telescope. The objective lens L is fixedly carried in a cell A having an integral flange A'. B is a body tube. C and D are a screw fastener and a space adjusting screw respectively.

The lens cell A is fixedly secured to the body tube B by three screw fasteners C, while the tips of three adjusting screws D abut on the shoulder of the body tube B to hold the lens cell A at a certain distance from the shoulder of the body tube B. By selectively turning the screws D, the optical axis of the lens L can be brought into coincidence with the axis of the body tube. But, because all the screws must be handled, the satisfactory adjusting operation can be done only by the skillful artisan. Another drawback is that after such adjusting operation has been completed, the resultant axial position of the lens often differs from the specified one.

FIG. 2 illustrates another example of the prior art wherein the cell E containing the objective lens L is fixedly secured to the body tube B by screw fasteners G. In this case, positioned between the flange E' of the lens cell E and the shoulder of the body tube B is a spacer F such as a tin foil to adjust the orientation of the lens axis. This adjusting device has not only the drawback of poor productivity, but also a problem that the adjustment cannot be carried out continuously.

SUMMARY OF THE INVENTION

An object of the present invention is to solve the above-described drawbacks of the prior art, and to provide a lens mounting which does not necessitate the secondary treatment of its parts such as screw-cutting as in the prior art, but enables a simple operation to adjust the tilt of an optical element. This leads to a reduction in cost.

Also, whilst in the prior art, there was need to increase the radial length of the flange of the lens cell to an extent that the screw-threaded holes are formed therein, it is in the present invention that a flange of far shorter radial length suffices for the aforesaid purpose.

Another object is to provide a lens mounting which makes it possible to form a more compact design.

BRIEF DESCRIPTION OF THE DRAWINGS

FIGS. 1A and 1B illustrate an example of the conventional lens holding device with FIG. 1A being a front elevational view and FIG. 1B being a side elevational view with its upper half in section.

FIG. 2 is similar to FIG. 1B except that another example of the conventional device is illustrated.

DETAILED DESCRIPTION OF THE PREFERRED EMBODIMENTS

Figure 3:
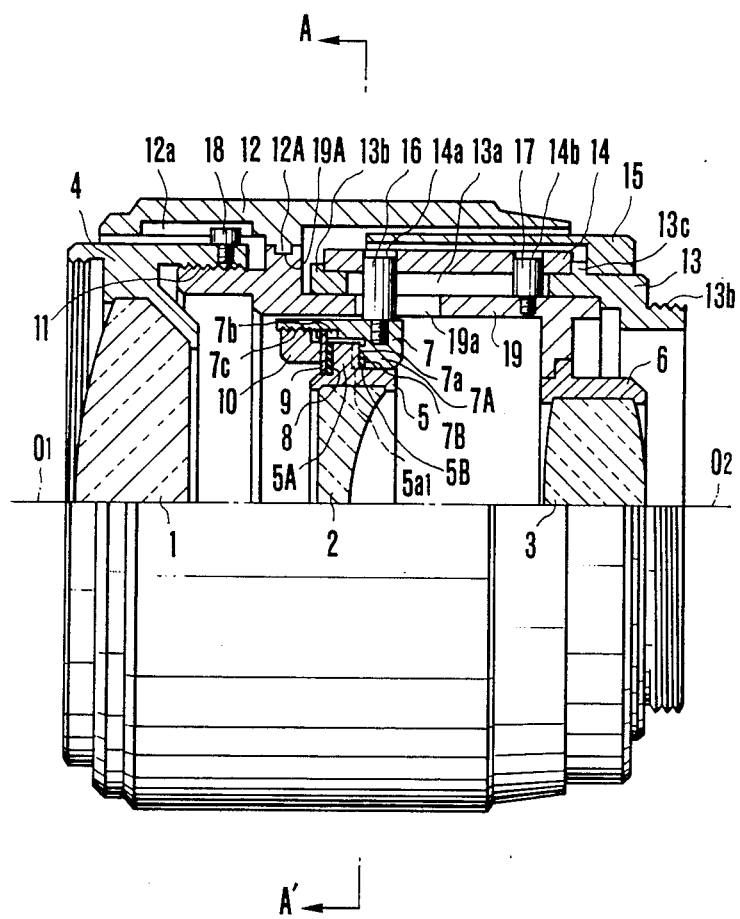
FIG. 3 is a longitudinal sectional view of an embodiment of a lens mounting according to the present invention.
Figure 4:
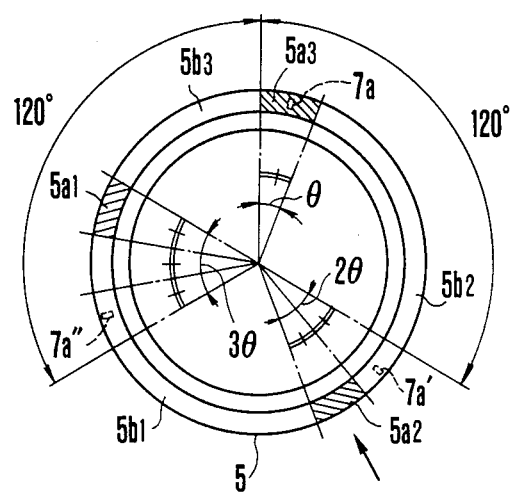
FIGS. 4 and 5 are geometric diagrams the principle of the invention.
Figure 5:
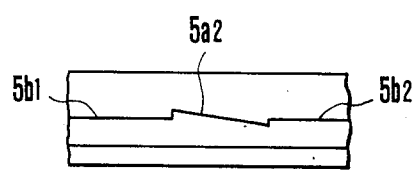

FIGS. 3 to 5 show a lens mounting according to a first embodiment of the invention. In the sectional view of FIG. 3, lens components 1, 2 and 3 are held in cells 4, 5 and 6 respectively, constituting a zoom lens. In this embodiment, the present invention is applied to axial adjustment of the variator lens 2.

The variator lens cell 5 has a projected portion 5A of radial direction to be clamped between a retainer member 10 and a movable sleeve 7. The movable sleeve 7 has a flanged portion 7A extending in a perpendicular direction to the optical axis and a helicoid-threaded portion 7C. The aforesaid projected portion 5A of the lens cell 5 and the flanged portion 7A of the movable sleeve 7 have confronting perpendicular surfaces 5B and 7B to an optical axis 01-02. The perpendicular surface 5B is provided with three camming areas 5$a$1, 5$a$2 and 5$a$3. Between the camming areas there are flat areas 5$b$1, 5$b$2 and 5$b$3 (see FIG. 4). Formed in the perpendicular surface 7B of the movable sleeve 7 are axially extended protuberances 7$a$, 7$a'$ and 7$a''$ in almost equally spaced relation. The three camming areas 5$a$1 5$a$2 and 5$a$3 formed in the perpendicular surface 5B of the projected portion 5A (outer peripheral portion) of the lens cell 5 are positioned in a common circle about the optical axis at different distances from each other as shown in FIG. 4, so that only one of them meets with either one of the protuberances 7$a$, 7$a'$ and 7$a''$ of the mated member thereto. A rubber ring 8 and a washer 9 as intermediate members lie between the retainer member 10 and the cell 5.

The washer 9 is provided with radial extensions on the outer periphery thereof engaging in axial key grooves 7$b$ provided in the movable sleeve 7. 11 is a helicoid thread; 12 is an actuator ring; 12$a$ is a key groove parallel to the optical axis provided in the inner surface of the actuator ring 12; 13 is a body tube; 13$a$ is an axially elongated slot cut in the body tube 13; 14 is a cam ring; 14$a$ is a camming slot; 14$b$ is a lead slot of a certain angle with the optical axis but in the cam ring 14; 13$b$ and 13$c$ are stepped portions to restrain the cam ring 14 from axial movement; 15 is an outer barrel; 16, 17 and 18 are guide pins; 19 is an axially movable sleeve, 19$a$ is an axially elongated guide slot cut in the sleeve 19. An inward radial projection 12A of the aforesaid actuator ring 12 fits in an engaging groove 19A of the axially movable sleeve so that the actuator ring 12 is rotatable relative to the axially movable sleeve 19 but in the axial directions it moves together with the latter. The cam ring 14, the axially movable sleeve, 19, the guide pin 16 and the guide slot 19$a$ and the camming slot 14$a$ constitute means for axially moving the sleeve 7.

The foregoing is the construction of the first embodiment. Next, a more detailed explanation is given about the essential parts of the invention. Out of the front shoulder 7B of the inward flange of the movable sleeve 7, the three protuberances 7$a$, 7$a'$ and 7$a''$ extend to the same height. The protuberances 7$a$, 7$a'$ and 7$a''$ are positioned in a common circle at an equal space from each other. FIG. 4 is a view looking from the rear of the lens cell 5 of FIG. 3. 5a1, 5a2 and 5a3 are camming surfaces in a common circle at an angle with a common plane perpendicular to the optical axis. These camming surfaces of the same form are positioned in such relation as shown in FIG. 4. Flat surfaces 5b1, 5b2 and 5b3 in the common circle of the camming surfaces 5a1, 5a2 and 5a3 belong to the same plane. FIG. 5 is a view looking from a direction indicated by an arrow of FIG. 4, illustrating how each of the camming surfaces 5a1, 5a2 and 5a3 is formed. The protuberances 7a, 7a' and 7a" are shown by dashed lines in FIG. 4, where the protuberance 7a only rides on the camming surface 5a3 while the other protuberances 7a' and 7a" are left to lie on the flat surfaces 5b2 and 5b1 respectively. Here on assumption that the lens cell 5 turns within such limits that the camming surface 5a3 does not move away from the protuberance 7a, the angle of inclination of the lens cell 5 can be changed as it turns about a line passing through the protuberances 7a' and 7a". Then, when the lens cell 5 is turned in the counterclockwise direction by an angle $\theta$, the camming surface 5a2 moves under the protuberance 7a', and when further turned by another angle $\theta$, the camming surface 5a1 moves under the protuberance 7a". Thus, the orientation of the lens cell 5 can be adjusted selectively in three different directions. After the completion of the adjustment of orientation, the retainer member 10 is screwed up through the intermediary of a rubber ring 8 and a washer 9. Since, at this time, the radial outward extensions of the washer 9 are fitted in the key grooves 7b provided in the inner surface of the movable sleeve 7 in parallel to the optical axis, rotation of the retainer member 10 is not transmitted by friction to the lens cell 5. Also, though the camming surfaces 5a1, 5a2 and 5a3 are illustrated in FIG. 5 as having an exaggerated slope, in actual practice that are very slightly inclined because the tilt of the lens axis to be corrected is minute. Therefore, the frictional force of the rubber ring 8 on the lens cell 5 hardly turns the latter to break the onceestalbished orientation.

Though the foregoing or first embodiment has been described in connection with the camming surfaces 5a1, 5a2 and 5a3 provided in the shoulder of the outward radial projection 5A of the cell 5 while the protuberances 7a, 7a' and 7a" provided in the shoulder of the flanged portion 7A of the movable sleeve, the camming surfaces may otherwise be provided in the shoulder 7B of the sleeve 7 and the protuberances on the shoulder 5B of the cell 5. Another example of a variation is that instead of using the rubber ring 8 and the washer 9 as the intermediate members in separate form, a single part whose confronting surface to the retainer member 10 is lubricous, and the opposite surface which confronts the cell 5 is elastic may be used. Still another example of a variation is that the ratainer ring 10 and the cell 5 are made of synthetic resin material with an advantage of removing the intermediate member or members.

Figure 6:
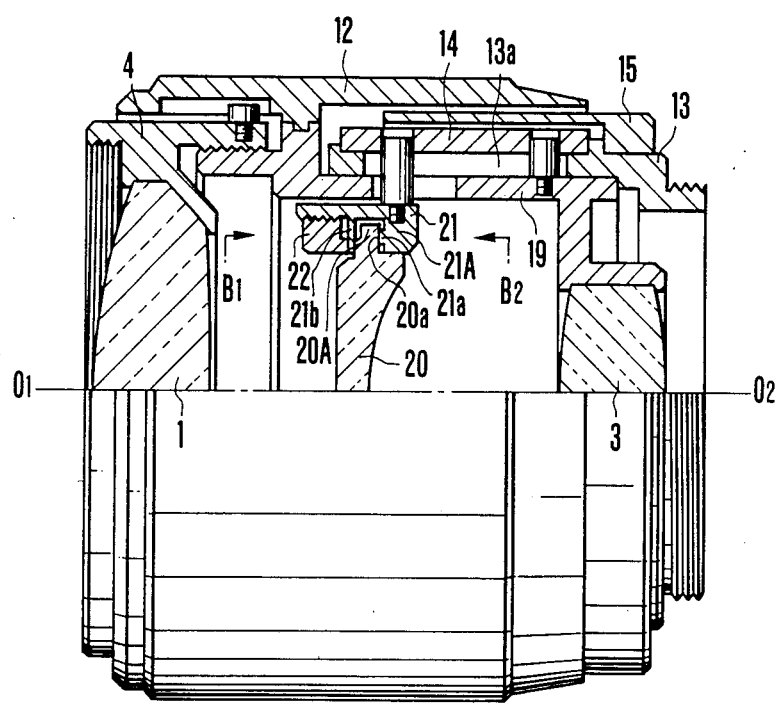
FIG. 6 is a sectional view of another embodiment of the invention.

FIG. 6 illustrates an example of modification of the device of FIG. 3, wherein 20 is a molded lens with camming surfaces 20a formed as a unit therewith in a flanged portion 20A on the outer periphery of the lens 20; 21 is a movable sleeve fixedly carrying the lens 20. 21a are protuberances on the shoulder of a flanged portion 21A extending in a perpendicular direction to the optical axis from the movable sleeve 21. 21b is a tongue-like portion extending inwardly of the movable sleeve 21. 22 is a retainer member screw-threadedly engaging with the movable sleeve 21. The relationship between the camming surface 20a and the protuberance 21a is the same as that shown in FIGS. 4 and 5, but in the embodiment of FIG. 6, instead of the rubber ring 8 and the washer 9, the tongue-like portion 21b is used. The tongue-like portion 21b is formed as a unit with the movable sleeve 21 by molding means. Because its end portion is thin, it can be readily deformed axially, whereby it is made possible for the retainer member 22 to clamp the lens 20 without causing its rotation to be transmitted thereto across the tongue-like portion 21b.

As has been described above, the combination of the camming surfaces with the protuberances in simple form sufficies for adjusting the orientation and alignment of the lens axis quickly and with ease.

Figure 7:
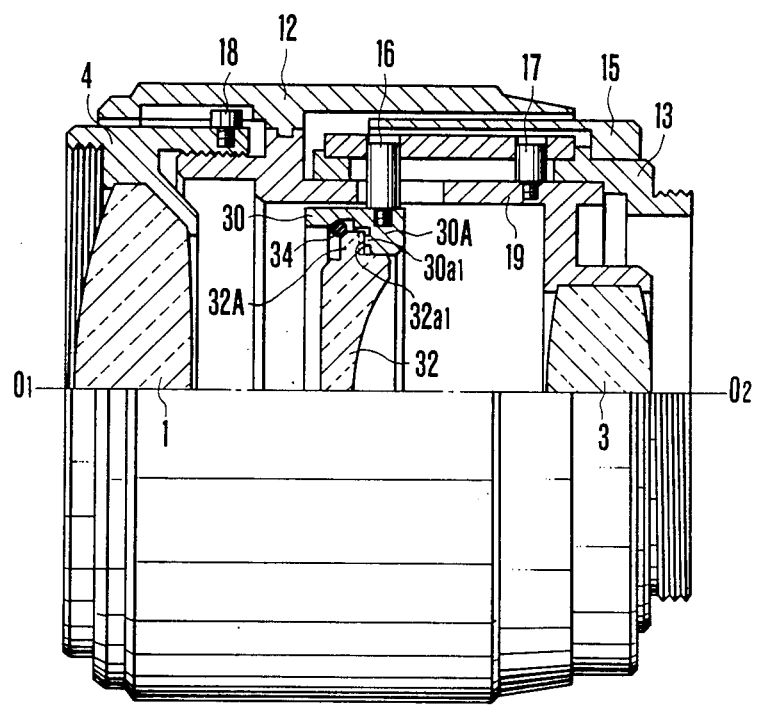
FIG. 7 is similar to FIG. 6 except that still another embodiment of the invention is illustrated.

FIG. 7 illustrates another embodiment of the invention.

In the embodiment of FIG. 7, a movable sleeve 30 is provided with a flanged portion 30A of perpendicular direction to an optical axis 01-02, and the front shoulder of the flanged portion 30A is provided with similar protuberances 30a1, 30a2 and 30a3 to those shown in FIG. 3.

An optical lens 32 has a flanged portion 32A of perpendicular direction to the optical axis and is made of either glass or plastic material by molding means. The one of the shoulders of the flanged portion 32A which confronts the flanged portion 30A of the movable sleeve 30 is provided with similar camming surfaces 32a1, 32a2 and 32a3 and flat surfaces 32b1, 32b2 and 32b3 to those 5a1, 5a2 and 5a3 and 5b1, 5b2 and 5b3 of the embodiment shown in FIGS. 3 and 4.

An elastic ring 34 retains the optical lens 32 in the movable sleeve 30. After the camming surfaces 32a1, 32a2 and 32a3 of the optical lens 32 were pressed against the protuberances 30a1, 30a2 and 30a3 of the movable sleeve 30 and the adjustment of orientation of the optical axis of the optical lens 32 has been completed, the elastic ring 34 is inserted into a groove formed in the inner periphery of the movable sleeve 30, whereby the optical lens is fixedly secured to the movable sleeve. According to this embodiment, the retainer ring 10, washer 9 and rubber ring 8 of the foregoing embodiments can be omitted.

Figure 8A:
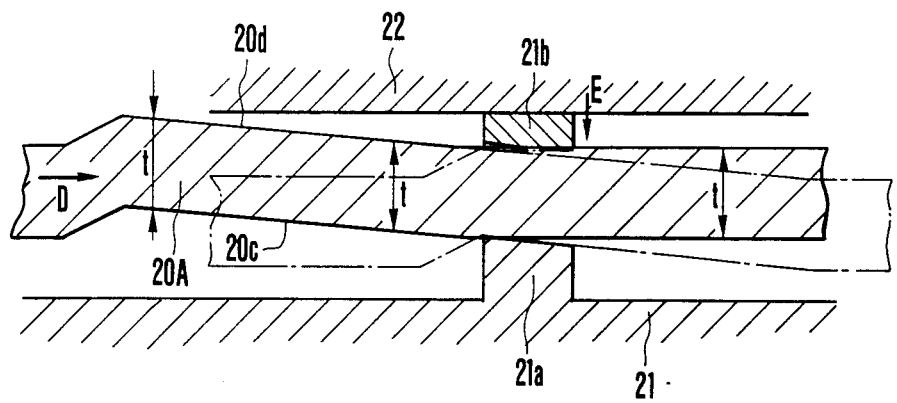
FIGS. 8A and 8B are fragmentary sectional views illustrating examples of further improvement of each of the embodiments of FIGS. 3 to 6.
Figure 8B:
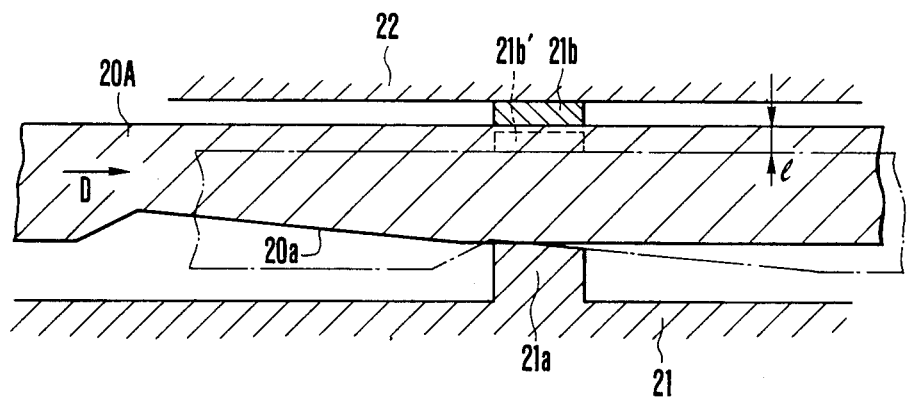

FIGS. 8A and 8B illustrate an example of using camming surfaces in both of the shoulders of the flanged portion 20A of the lens 20 of FIG. 6. The embodiment of FIG. 8A exemplifies protection of the tonguelike portion 21b provided in the movable sleeve 21.

That is, in the case of FIG. 6, the cam is formed in one shoulder of the flanged portion 20A, the other shoulder of which is flat, so that as the tongue-like portion 21b is largely deformed, there is a high possibility of damaging it at the root. This point will be described in more detail by reference to FIG. 8B. FIG. 8B is an expanded view taken along line B1-B2 of FIG. 6. An the orientation of the lens axis 20 is adjusted, when the lens 20 is turned about the optical axis, the camming surface 20a of the lens 20 shown by the solid line moves in a direction indicated by arrow D while abutting on the protuberance 21a of the movable sleeve 21. After the movement, the lens 20 takes a position shown by a dot-and-dash line. After the tilt adjustment of the lens 20 has been completed, when the retainer member 22 is tightened, the tongue-like portion 21b of the movable sleeve 21 is deformed from a position shown by solid lines to another position (21b') shown by dashed lines. The tongue-like portion 21b is, therefore, caused to displace a distance l. Since the movable sleeve 21 has a form such as shown in FIG. 6, or the screw-threaded portion for mesh with the retainer ring 22, the flanged portion 21A and the tongue-like portion 21b, it is desirable to use plastic material in making up the movable sleeve 21 by molding means. In this case, however, if the tongue-like portion 21b is allowed to deflect through too large an angle corresponding to the distance l shown in FIG. 8B, or if it is designed in such a way as to allow for a large amount of adjustment, the required amount of deflection of the tongue-like portion 21b becomes large. As the elastic limit is exceeded, therefore, it will often be broken. To avoid this problem, according to the invention, as shown in FIG. 8A, both of the front and rear shoulders of the flanged portion 20A of the lens 20 are provided with respective camming surfaces of similar shape to each other. In FIG. 8A, the camming surfaces are denoted by 20c and 20d.

The pair of camming surfaces 20c and 20d is plural in number and they are positioned in such relation as shown in FIG. 4. The axial thickness "t" of the flanged portion 20A is made uniform. According to the construction of FIG. 8A, when the lens 20 is turned in the direction indicated by arrow D to adjust the orientation of the lens axis, it is the camming surface 20c that slidingly moves on the protuberance 21a of the movable sleeve 21 and the opposite camming surface 20d that slindingly moves on the tongue-like portion 21b of the movable sleeve 21. Because the width (thickness) of the flanged portion 20A is the same over the entire length, the movement of the lens in the direction of arrow D does not cause displacement of the tongue-like portion 21b in the direction of arrow E. Therefore there is no possibility of occurrence of damage of the tongue-like portion 21b.

What is claimed is:

1. A lens mounting comprising:
   (a) a body tube;
   (b) a holding sleeve holding a lens,
      said holding sleeve having a perpendicular surface of perpendicular direction to an optical axis, and a camming surface being formed in said perpendicular surface;
   (c) a movable sleeve arranged in the inner diameter of said body tube said movable sleeve including a perpendicular surface perpendicular to a direction parallel with the optical axis which confronts the camming surface of said holding sleeve, and protruded portions projected from said perpendicular surface of said movable sleeve; and
   (d) a retainer member,
      said retainer member fixedly securing said holding sleeve to said movable sleeve after said holding sleeve was fitted in the inner diameter of said movable sleeve to bring said camming surface into contact with said protruded portion and the adjustment of said holding sleeve has been completed.

2. A lens mounting comprising:
   (a) a body tube;
   (b) a holding sleeve holding a lens,
      said holding sleeve having a plurality of protruded portions projected to a parallel direction with an optical axis and positioned in a circle with its center at the optical axis;
   (c) a movable sleeve arranged in the inner diameter of said body tube,
      said movable sleeve having a perpendicular surface perpendicular parallel direction with the optical axis, and a plurabity of camming surfaces being formed in said perpendicular surface; and
   (d) a retainer member, said retainer member fixedly securing said holding sleeve to said movable sleeve after said holding sleeve was fitted in the inner diameter of said movable sleeve and the tilt of said lens has been adjusted by the abutting engagement of said camming surfaces on said protruded portions.

3. A lens mounting comprising:
   (a) a body tube;
   (b) a sleeve holding a lens;
   (c) a movable sleeve arranged in the inner diameter of said body tube;
   (d) means for adjusting the tilt of said lens,
      said adjusting means comprising:
      perpendicular surfaces to an optical axis provided in said holding sleeve and said movable sleeve respectively, camming surfaces formed in one of said perpendicular surfaces, and protuberances formed in the other perpendicular surface and arranged to contact with said camming surfaces; and
   (e) means for fixedly securing said holding sleeve to said movable sleeve,
      said securing means comprising: a retainer ring having a threaded portion for helicoidcoupling with said movable sleeve, and projections extending from said movable sleeve into a space between said holding sleeve and said retainer ring, whereby the tightening force of said retainer ring is transmitted through said projections to said holding sleeve so that said holding sleeve is clamped by said retainer ring and said movable sleeve.

4. A lens mounting according to claim 1 or 2, wherein said retainer member and said movable sleeve are screw-threadedly coupled with each other, and said holding sleeve is clamped between said retainer member and said movable sleeve;
   said lens mounting further comprising:
   an intermediate ring between said retainer member and said holding sleeve, said intermediate ring having a lubricous surface which confronts said retainer member and an elastic surface which confronts said holding sleeve.

5. A lens mounting comprising;
   (a) a body tube;
   (b) a movable sleeve arranged in the inner diameter of said body tube,
      said movable sleeve including a flanged portion having shoulders perpendicular to an optical axis, a screw-threaded portion, and projections positioned between said flanged portion and said screw-threaded portion and radially extending;
   (c) a holder containing a lens,
      said holder having an outer circumferential portion inserted into a space between the projections and the flanged portion of said securing movable sleeve;
   (d) means for adjusting the tilt of said lens,
      said adjusting means comprising camming surfaces formed in one of the outer circumferential portion of said holder and the flanged portion of said movable sleeve, and protuberances formed in the other and arranged to contact with said camming surfaces; and (e) means for fixedly securing said holder to said movable sleeve, said means comprising a tightening ring engaging with the screw-threaded portion of said movable sleeve, and pressing the outer circumferential portion of said holder against said movable sleeve through said projections.

6. A lens mounting according to claim 5 further comprising:

camming surfaces of similar shape to that of said camming surfaces formed in the outer circumferential portion of said holder which confronts said projections.

7. A lens mounting according to claim 5, further comprising:

camming surfaces formed in the outer circumferential portion of said holder which confronts said tightening ring and similar in shape to the camming surfaces that confront the projections of said movable sleeve.

* * * * *